United States Patent
Abe

(10) Patent No.: US 10,181,094 B2
(45) Date of Patent: Jan. 15, 2019

(54) RECORDING APPARATUS AND CONTROL METHOD THEREOF

(71) Applicant: SEIKO EPSON CORPORATION, Tokyo (JP)

(72) Inventor: Masanori Abe, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/608,069

(22) Filed: May 30, 2017

(65) Prior Publication Data

US 2018/0005091 A1 Jan. 4, 2018

(30) Foreign Application Priority Data

Jun. 30, 2016 (JP) .................. 2016-129693

(51) Int. Cl.
*G06K 15/12* (2006.01)
*G06K 7/10* (2006.01)
*G03G 15/00* (2006.01)

(52) U.S. Cl.
CPC ..... *G06K 15/1219* (2013.01); *G06K 7/10405* (2013.01); *G03G 15/80* (2013.01)

(58) Field of Classification Search
None
See application file for complete search history.

(56) References Cited

U.S. PATENT DOCUMENTS

2007/0279649 A1* 12/2007 Nakamaki ................ B41J 2/235
358/1.8

FOREIGN PATENT DOCUMENTS

| JP | 61-246072 A | 11/1986 |
|----|----|----|
| JP | 61-252179 A | 11/1986 |
| JP | 04-191055 A | 7/1992 |
| JP | 2015171024 A * | 9/2015 |

OTHER PUBLICATIONS

Takeuchi, K, Machine translation of JP2015171024A, Counter Electromotive Voltage Regneration Circuit of Dot Impact Printer, Sep. 28, 2015, Paragraph 0010 and all drawings.*
IP.com search.*
IP.com search (Year: 2018).*

* cited by examiner

*Primary Examiner* — Lisa Solomon

(57) ABSTRACT

A recording apparatus includes a head including a wire and performing recording on a medium by allowing the wire to strike the medium, a temperature detection unit that detects a temperature of the head, a driving circuit for driving the wire, and a control unit that controls an energization state of the driving circuit. The control unit switches the energization state of the driving circuit between an ON state and an OFF state at each time determined by the control unit, based on the temperature detected by the temperature detection unit such that a current flowing in the driving circuit is kept constant, when the head performs recording on the medium.

10 Claims, 13 Drawing Sheets

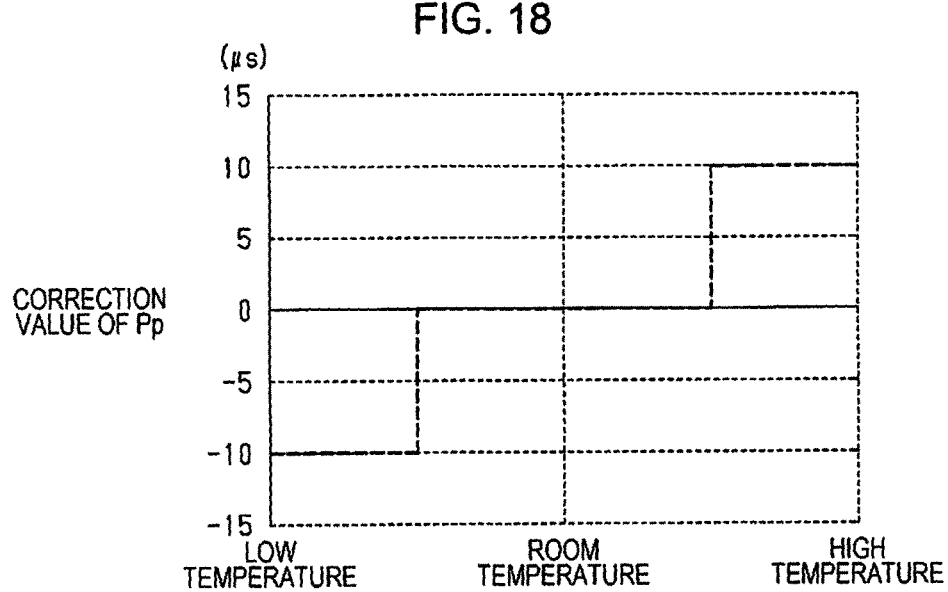
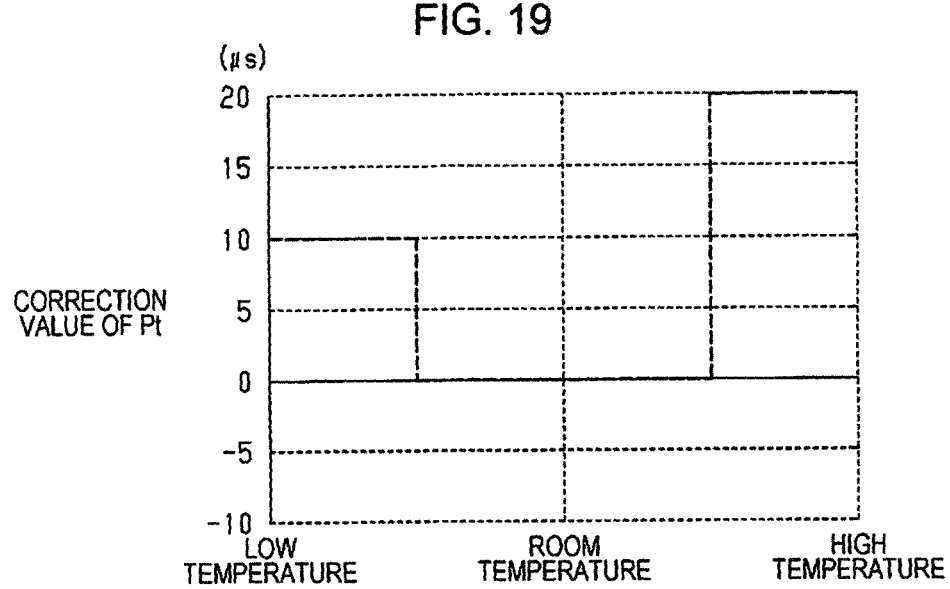

RECORDING APPARATUS AND CONTROL METHOD THEREOF

CROSS REFERENCES TO RELATED APPLICATIONS

The entire disclosure of Japanese Patent Application No. 2016-129693, filed Jun. 30, 2016 is expressly incorporated by reference herein.

BACKGROUND

1. Technical Field

The present disclosure relates to a recording apparatus that performs recording on a medium using, for example, an ink ribbon and a control method thereof.

2. Related Art

In the related art, a dot impact type recording apparatus in which a head includes a plurality of wires and the wires strike a medium by extending beyond an ink ribbon to thereby perform recording on the medium is known. Such a recording apparatus performs recording on the medium in such a way that a current is caused to flow in a driving circuit driving the wires and tips of the wires are blasted off from the head by magnetic flux generated by coils constituting the driving circuit. The wires are driven by a current that flows in the coils and thus, it is preferable that the current flowing in the coils be kept constant in order for the head to stably perform recording on the medium.

In JP-A-4-191055, a recording apparatus which keeps the current flowing in a coil constant by using a switching element such as a transistor and a comparator is described. In the recording apparatus, an output of the comparator is connected to a base terminal of the transistor and an energization state of the coil is switched between an ON state and an OFF state based on the magnitude of two input voltages input to the comparator so as to control (so-called chopper control) the current that flows in the coil to be kept constant.

In the meantime, while there is a recording apparatus as described in JP-A-4-191055 which performs chopper control by switching an output of the comparator based on a value of a voltage input to the comparator, a recording apparatus which performs chopper control such that the current flowing in the coil is kept constant by switching an energization state of the driving circuit based on a predetermined time is also known. However, in the latter recording apparatus, there is an actual condition that the current flowing in the coil is not kept constant and unevenness is caused in recording quality.

SUMMARY

An advantage of some aspects of the disclosure is to provide a recording apparatus in which a head can stably perform recording on a medium even in a configuration in which an energization state of a driving circuit is switched based on time and a control method thereof.

Hereinafter, means of the disclosure and operation effects thereof will be described.

According to an aspect of the disclosure, there is provided a recording apparatus which includes, a head that includes a wire and performs recording on a medium by allowing the wire to strike the medium, a temperature detection unit that detects a temperature of the head, a driving circuit for driving the wire, and a control unit that controls an energization state of the driving circuit. The control unit switches the energization state of the driving circuit between an ON state and an OFF state at each time determined by the control unit, based on the temperature detected by the temperature detection unit, when the head performs recording on the medium.

In general, resistance values of elements constituting a driving circuit vary by the temperature. That is, even when a fixed voltage is applied to the driving circuit, a value of a current that flows in the driving circuit varies by the temperature. In that point, according to the configuration described above, the control unit controls the energization state of the driving circuit on the basis of the time determined based on the temperature of the head detected by the temperature detection unit and thus, it is possible to keep the current that flows in the driving circuit constant. Accordingly, the head can stably perform recording on the medium even in a configuration in which the energization state of the driving circuit is switched based on time.

In the recording apparatus, a voltage detection unit that detects a voltage applied to the driving circuit is further included, and the control unit preferably switches the energization state of the driving circuit between the ON state and the OFF state at each time determined by the control unit, based on the temperature of the head detected by the temperature detection unit and the voltage detected by the voltage detection unit, when the head performs recording on the medium.

In general, even in a power supply that applies a constant voltage, fluctuations may be caused in the voltage applied from the power supply by the use environment. When the voltage of the power supply fluctuated, the value of the current that flows in the driving circuit may be varied. In that point, according to the configuration described above, the control unit controls the energization state of the driving circuit on the basis of the time determined based on a voltage of the driving power supply detected by the voltage detection unit and the temperature of the head detected by the temperature detection unit and thus, it is possible to keep the current that flows in the driving circuit constant.

In the recording apparatus, the control unit preferably controls a signal which is input to the driving circuit so as to switch the energization state of the driving circuit to thereby control the energization state of the driving circuit.

According to this configuration, it is possible to easily control the energization state of the driving circuit.

In the recording apparatus, the control unit preferably determines initial duration during which the ON state continues, an interruption time period during which the OFF state continues, and duration-after-interruption during which the ON state continues after the interruption time period, in control of the energization state in the driving circuit.

According to this configuration, it is possible to finely control the energization state of the driving circuit.

According to another aspect of the disclosure, there is provided a recording apparatus which includes a head that includes a wire and performs recording on a medium by allowing the wire to strike the medium, a driving circuit for driving the wire, a voltage detection unit that detects a voltage applied to the driving circuit, and a control unit that controls an energization state of the driving circuit. The control unit switches the energization state of the driving circuit between an ON state and an OFF state at each time determined by the control unit, based on the voltage detected by the voltage detection unit, when the head performs recording on the medium.

The recording apparatus according to this configuration exhibits the same effect as that of the above-described recording apparatus.

According to still another aspect of the disclosure, there is provided a control method of a recording apparatus, the control method including acquiring a value of at least one of a temperature of a head including a wire and a voltage applied to a driving circuit that drives the wire when the head performs recording on a medium and switching the energization state of the driving circuit between an ON state and an OFF state at each time determined based on the acquired value, in the recording apparatus that performs recording on the medium by allowing the wire to strike the medium.

According to this configuration, the control method exhibits the same effect as those of the recording apparatuses described above.

BRIEF DESCRIPTION OF THE DRAWINGS

The disclosure will be described with reference to the accompanying drawings, wherein like numbers reference like elements.

FIG. 18 is a graph illustrating a map of a correction value of the Pp determined based on the value of the temperature detected by the temperature detection unit.

FIG. 19 is a graph illustrating a map of a correction value of the Pt determined based on the value of the temperature detected by the temperature detection unit.

DESCRIPTION OF EXEMPLARY EMBODIMENTS

In the following, an embodiment of a recording apparatus will be described with reference to the accompanying drawings.

Figure 1:
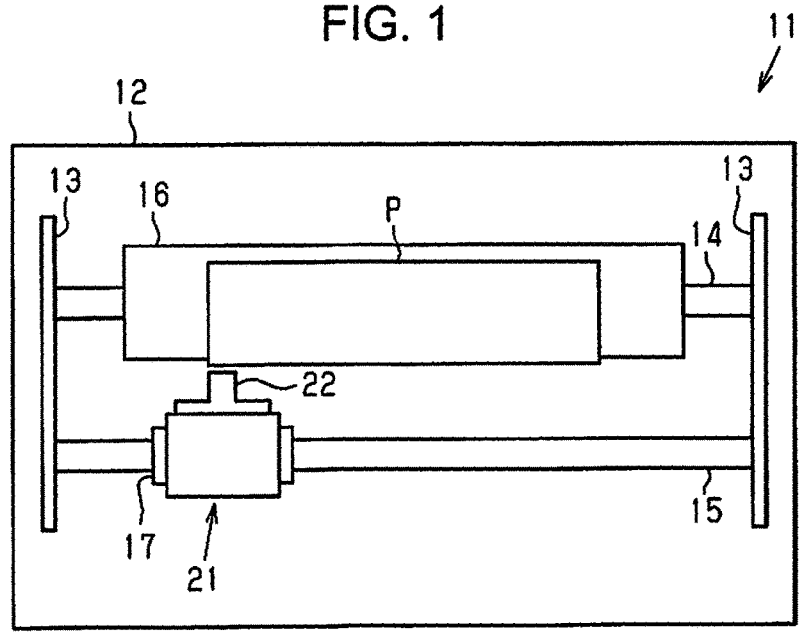
FIG. 1 is a plan view schematically illustrating an embodiment of a recording apparatus.

As illustrated in FIG. 1, a recording apparatus 11 includes a rectangular case 12 of which a lateral direction corresponds to a longitudinal direction in FIG. 1. Frame members 13 opposing each other are disposed at both ends in the longitudinal direction inside of the case 12. A rotation shaft 14 and a guide shaft 15 are laid in parallel with each other along the longitudinal direction in the two frame members 13. The rotation shaft 14 is rotatably provided to the frame members 13 and a cylindrical roller 16 which is lengthier in the longitudinal direction is attached to the outer circumferential surface of the rotation shaft 14. The roller 16 is rotatable together with the rotation shaft 14 and is rotated to transport a medium P, for example, paper. That is, the roller 16 functions as a transport portion transporting the medium P. The medium P is wound around the roller 16 so as to be transported along a direction intersecting the longitudinal direction of the case 12.

A carriage 17 which is movable along a guide shaft 15 is attached to the guide shaft 15. A head 21 which performs recording on the medium P is mounted on the carriage 17. The head 21 is located to be opposed to the roller 16. The head 21 includes a nozzle portion 22 protruding toward the roller 16. The head 21 performs recording on the medium P by causing a wire (see FIG. 4) 20 to protrude from the tip of the nozzle portion the nozzle portion 22, which opposes the roller 16. That is, the recording apparatus 11 is a dot impact type printer which performs recording on the medium P by allowing the wire 20 to strike the medium P.

In such a recording apparatus 11, the wire 20 applies pressure to the medium P through an ink ribbon and the like such that dots are copied onto the medium P to print characters or codes. In the present embodiment, the recording apparatus 11 adopts pressure-sensitive paper, for example, no-carbon paper, as the medium P and thus, is possible to perform recording on the medium P by single units without using the ink ribbon. A configuration in which a separate ink ribbon is provided between the roller 16 and the nozzle portion 22 may also be adopted. The head 21 performs recording on the medium P supported on the roller 16 while moving in the main scanning direction by the carriage 17. In the present embodiment, a main scanning direction which is the moving direction of the head 21 moved by the carriage 17 coincides with the longitudinal direction of the case 12. A direction in which the medium P is transported by the roller 16 becomes a sub-scanning direction intersecting the main scanning direction.

Figure 2:
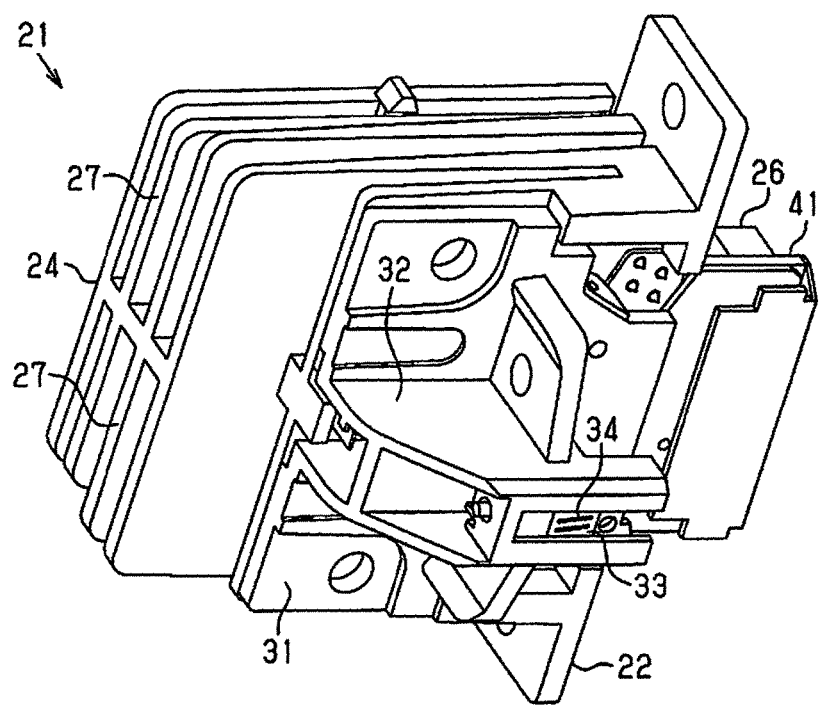
FIG. 2 is a perspective view of a head.
Figure 3:
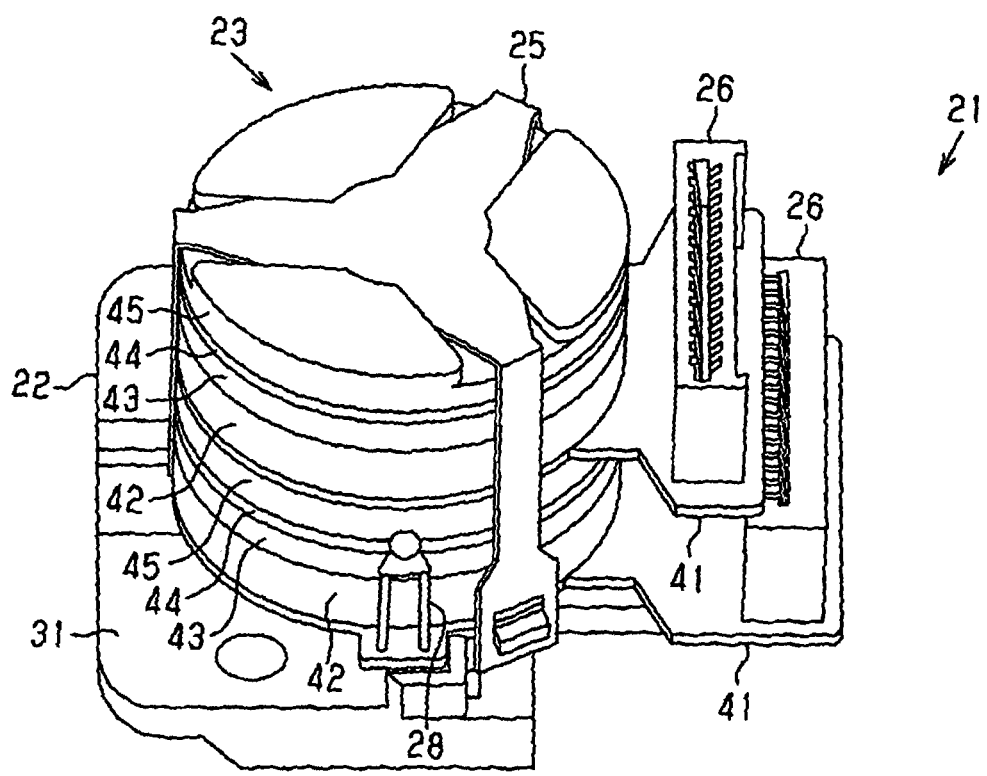
FIG. 3 is a perspective view of the head from which a radiator is removed.

As illustrated in FIG. 2 and FIG. 3, the head 21 includes a body portion 23 constituting a body of the head 21 and having a cylindrical outer shape, a nozzle portion 22 connected to the lower side of the body portion 23, and a radiator 24 provided so as to cover the body portion 23 from the outer circumferential side. The body portion 23 is configured such that various members including two substrates 41 are stacked on each other. Various members constituting the body portion 23 will be described later. The body portion 23 is fixed to the nozzle portion 22 by a trifurcated fixing band 25 extending along the outer peripheral surface from the top surface of the body portion 23. In each of substrates 41, a driving circuit (see FIG. 5) 60 for driving the wire 20 is formed and a terminal stand 26 for supplying power to the head 21 is provided.

A radiator 24 includes a plurality of plate-shaped fins 27. The radiator 24 functions as so-called a heat sink and radiates the heat of the head 21 by being brought into contact with the outside air. In general, power consumption and a heat generation amount when performing recording of the dot impact type head 21 are greater in comparison with an ink jet head. For that reason, the radiator 24 is provided such that a temperature rise of the head 21 is suppressed and a driving operation of the head 21 becomes stable. A thermistor 28 for detecting the temperature of the head 21 is provided between the body portion 23 and the radiator 24.

The nozzle portion 22 includes a plate-shaped portion 31 attached to the bottom of the cylindrical body portion 23 and a protruding portion 32 protrudes downward from substantially the center of the plate-shaped portion 31. In the tip of the protruding portion 32, a protruding surface 33 which allows the tip of the wire 20 to protrude into the head 21 through the nozzle portion 22 is provided. That is, a plurality of wire holes 34 for allowing the tip of the wire 20 to project are provided on the protruding surface 33.

Figure 4:
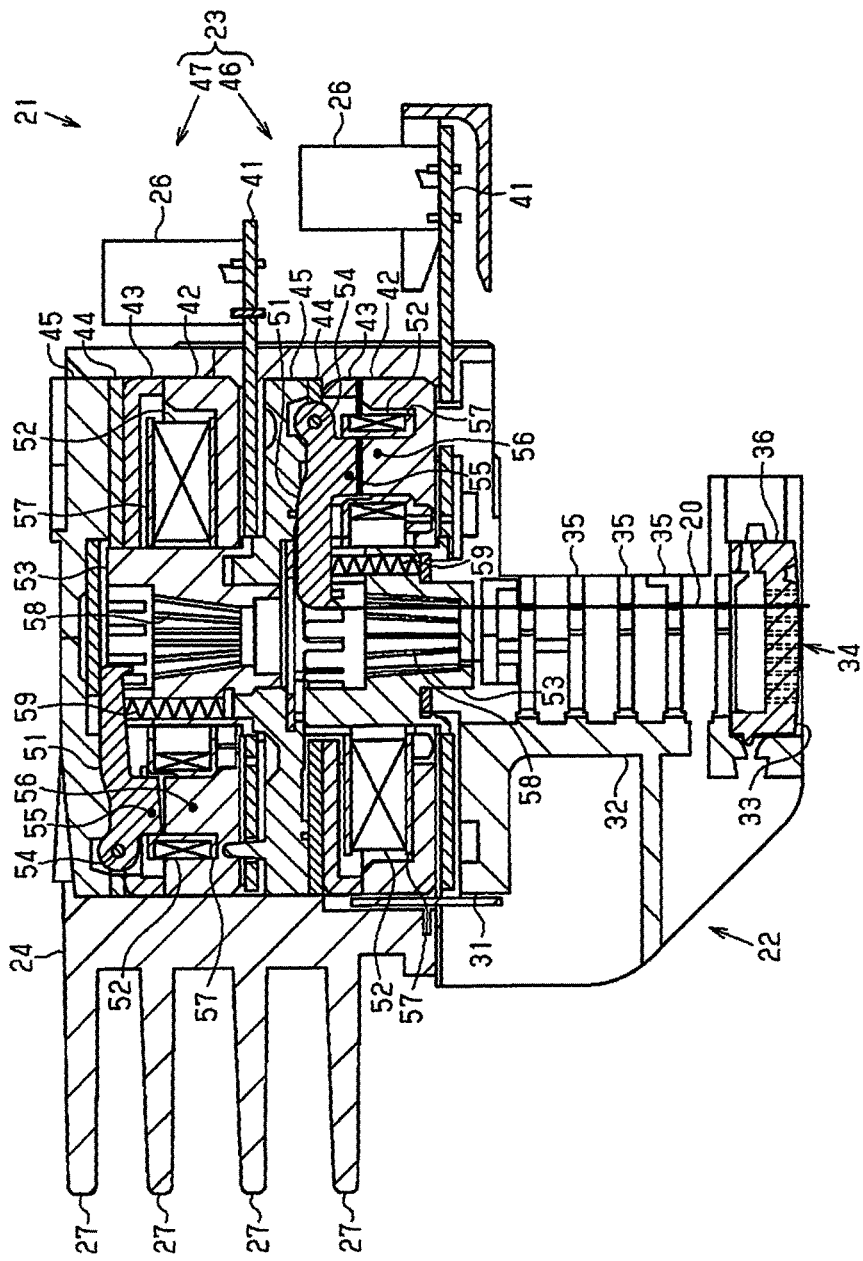
FIG. 4 is a schematic cross-sectional view of the head.

As illustrated in FIG. 4, the outer shape of the cylindrical body portion 23 is formed by a unit in which five types of members of substrates 41, frames 42, yokes 43, side yokes 44, and covers 45 are stacked on one another in this order from the nozzle portion 22 side. In the present embodiment, the five types of members are further repeatedly stacked on one another and the body portion 23 is configured by a two-stage of a front stage unit 46 and a rear stage unit 47.

Next, description will be made on the front stage unit 46 located on the nozzle portion 22 side among the front stage unit 46 and the rear stage unit 47 that constitute the body portion 23.

The front stage unit 46 includes wire levers 51 for driving the wire 20 that extends from the inside of the body portion 23 to the inside of the nozzle portion 22 in the front stage unit 46, coils 52 for driving the wire levers 51, and cylindrical holders 53 for holding portions of the wire levers 51. The plurality of wire levers 51 are aligned to form an annular arrangement shape in the cylindrical body portion 23 and respective wire levers 51 are disposed such that the longitudinal direction of the plurality of wire levers 51 extends radially from the center side of the body portion 23 toward the outside thereof. The wire 20 is attached to the tips of the wire levers 51 located at the center side of the inside of the body portion 23. On the other hand, base ends of the wire levers 51 that are located at positions closer to the outside of the inside of the body portion 23 are supported by shafts 54. That is, the wire levers 51 are provided to be rotatable around the shafts 54 in the body portion 23 and the tips of the wire levers 51 are movable along the extending direction of the wire 20. Armature portions 55 are provided in portions formed between the tips and base ends in the wire levers 51.

A plurality of frames 42 are aligned to be corresponded to the wire levers 51 in the body portion 23. Core portions 56 protruding toward the armature portions 55 of the wire levers 51 are provided in the frames 42. The core portions 56 are provided in portions formed between the center and the outer surface side of the cylindrical body portion 23 in the frames 42. The coils 52 are arranged and inserted into the core portions 56, respectively. The coils 52 are configured such that a metal wire such as an enameled wire is wound around bobbins 57. A portion of the armature portions 55 of the wire levers 51 and the core portions 56 of the frames 42 are inserted into the coils 52. Currents flow in the coils 52 by supplying power to the substrates 41.

The holders 53 are provided at positions that form the center side in the inside of the body portion 23 so as to hold the tips of the wire levers 51. A plurality of grooves 58 for guiding the wire 20 into the inner circumferential surface of the cylindrical holders 53 are provided in the cylindrical holders 53. That is, the wire 20 attached to the tips of the wire levers 51 extends toward the nozzle portion 22 side along the grooves 58 of the holders 53. Springs 59 for urging the tips of the wire levers 51 are provided on the holders 53. The springs 59 urge the tips of the wire levers 51 toward a direction away from the nozzle portion 22. Intermediate guide portions 35 and a tip guide portion 36 that guide the wire 20 are provided inside of the nozzle portion 22 communicating with the holders 53. A wire hole 34 for allowing the tip of the wire 20 to protrude from the head 21 is provided in the tip guide portion 36.

Here, the frames 42 and the wire levers 51 are formed with a soft magnetic material such as soft ferrites. For that reason, when power is supplied to the substrates 41 and the current flows in the coils 52, the frames 42 and the wire levers 51 are magnetized by magnetic flux generated by the coils 52. By being subjected to magnetization, the armature portions 55 of the wire levers 51 are attracted to the core portions 56 of the frames 42 and rotated around the shafts 54. When the tips of the wire levers 51 move toward the nozzle portion 22 side against an urging force of the springs 59, the wire 20 protrudes from the wire hole 34. That is, the wire 20 is driven by allowing the current to be flown to the coils 52. When the coils 52 become a non-energization state, magnetic flux of the coils 52 disappears, the wire levers 51 return to its original position by the springs 59 that urge the tips of the wire levers 51, and the wire 20 is drawn into the nozzle portion 22. The head 21 performs recording on the medium P by repeating the operations described above.

Yokes 43 and side yokes 44 are also formed with a soft magnetic material such that a magnetic force of the coils 52 becomes more stable and driving of the head 21 becomes stable. Thus far, although description was made on the front stage unit 46, the rear stage unit 47 also has a configuration similar to that of the front stage unit 46. Although not illustrated, the wire 20 attached to the tips of the wire levers 51 in the rear stage unit 47 passes through the holders 53 of the rear stage unit 47 and the holders 53 of the front stage unit 46 to extend into the nozzle portion 22.

Figure 5:
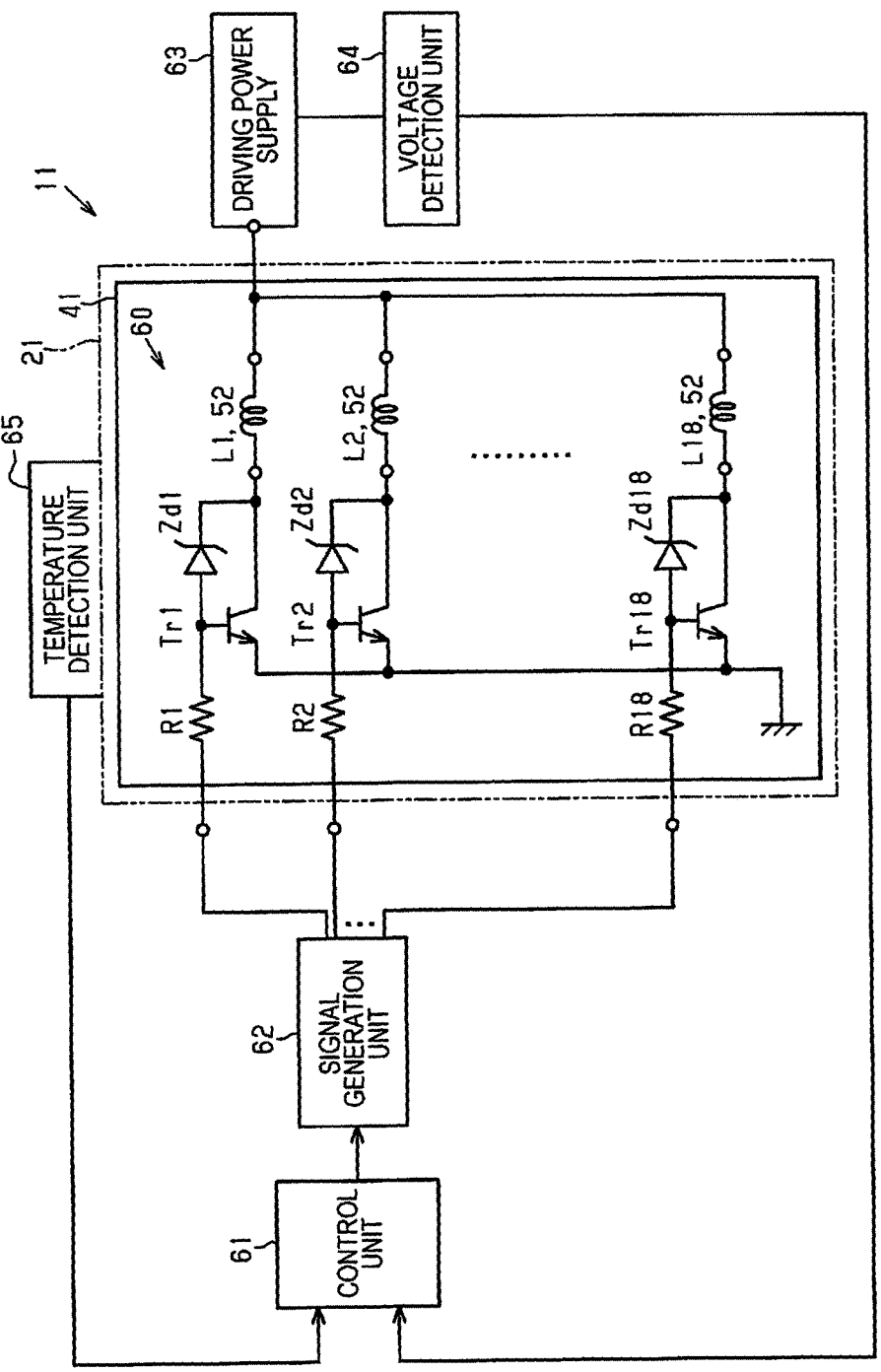
FIG. 5 is a block diagram illustrating a circuit configuration of a driving circuit and an electrical configuration of the recording apparatus.

As illustrated in FIG. 5, the recording apparatus 11 includes a control unit 61 that controls a recording operation of the head 21. The control unit 61 controls operations of various members constituting the recording apparatus 11 such as the roller 16 transporting the medium P or the carriage 17 moving the head 21, as well as the head 21. The recording apparatus 11 includes a signal generation unit 62 generating a pulse. The signal generation unit 62 is connected to the driving circuit 60 for driving the wire 20 and inputs the generated pulse to the driving circuit 60. The signal generation unit 62 is electrically connected with the control unit 61 and is controlled by the control unit 61.

The recording apparatus 11 includes a driving power supply 63 that supplies power to the driving circuit 60, a voltage detection unit 64 that detects a voltage applied from the driving power supply 63 to the driving circuit 60, and a temperature detection unit 65 that detects a temperature of the head 21. The voltage detection unit 64 and the temperature detection unit 65 always detect values of the voltage and the temperature, respectively. The control unit 61 is electrically connected with the voltage detection unit 64 and the temperature detection unit 65 and suitably acquires a value of the voltage detected by the voltage detection unit 64 and a value of the temperature detected by the temperature detection unit 65. The temperature detection unit 65 is connected with the thermistor 28 and calculates the temperature of the head 21 from a resistance value of the thermistor 28.

The driving circuit 60 configured with a plurality of elements is provided in the substrates 41 included in the head 21. In the present embodiment, although two substrates 41 are provided, the substrates are collectively illustrated as a single substrate as illustrated in FIG. 5. The driving circuit 60 is configured with a plurality of resistors R1 to R18 (R), a plurality of transistors Tr1 to Tr18 (Tr), a plurality of Zener diodes Zd1 to Zd18 (Zd), and a plurality of coils L1 to L18 (L). Here, the coils L1 to L18 correspond to the coils 52 inserted into the core portions 56 of the frames 42 as illustrated in FIG. 4. That is, the head 21 includes eighteen wires 20 in the present embodiment. Respective wires 20 are independently driven by allowing the current to be flown in respective corresponding coils L1 to L18.

Next, description will be made on a configuration of the driving circuit 60 by paying attention to the resistor R1, the transistor Tr1, the Zener diode Zd1, and a coil L1.

One end of the coil L1 is connected to the driving power supply 63 and the other end thereof is connected to a collector terminal of the transistor Tr1. The emitter terminal of the transistor Tr1 is grounded to an earth and the Zener diode Zd1 is connected with the transistor Tr1 so as to be sandwiched between the base terminal and the collector terminal of the transistor Tr1. The anode of the Zener diode Zd1 is connected to the base terminal of the transistor Tr1 and the cathode thereof is connected to the collector terminal of the transistor Tr1. One end of the resistor R1 is connected to the base terminal of the transistor Tr1 and the other end thereof is connected to the signal generation unit 62.

In the driving circuit 60 in which respective elements are connected with each other as described above, when a pulse generated from the signal generation unit 62 is input to the base terminal of the transistor Tr1 through the resistor R1, a section between the collector terminal and the emitter terminal becomes conductive in the transistor Tr1 and the current flows from the driving power supply 63 toward the earth. That is, an energization state of the driving circuit 60 becomes the ON state and the current flows in the coil L1. When input of the pulse to the base terminal of the transistor Tr1 is ended, a section between the emitter terminal and the collector terminal becomes non-conductive in the transistor Tr1 and the energization state of the driving circuit 60 becomes the OFF state. That is, the transistor Tr1 functions as a switching element in the driving circuit 60 and the energization state of the driving circuit 60 is switched by the pulse generated from the signal generation unit 62. The energization state of the coil L1 coincides with the energization state of the driving circuit 60.

Here, when the energization state of the driving circuit 60 is switched, a large counter-electromotive force is generated from the coil L1. When the counter-electromotive force is applied to the transistor Tr1, there is a possibility that the withstand voltage of the transistor Tr1 is exceeded and the transistor Tr1 is broken down. For that reason, the Zener diode Zd1 is provided in the driving circuit 60. The Zener diode Zd1 is provided in order to protect the transistor Tr1 and absorbs the counter-electromotive force generated from the coil L1.

In short, the energization state of the driving circuit 60 becomes the ON state in a time period during which the pulse is input to the base terminal of the transistor Tr1 and becomes the OFF state in a time period during which the pulse is not input to the base terminal of the transistor Tr1. Matters described above are similarly applied to the driving circuit 60 configured with respective resistors R2 to R18, transistors Tr2 to Tr18, Zener diodes Zd2 to Zd18, and coils L2 to L18. The control unit 61 controls the signal generation unit 62 to selectively generate the pulse for the transistors Tr1 to Tr18. That is, the control unit 61 controls the energization state of the driving circuit 60.

Figure 6:
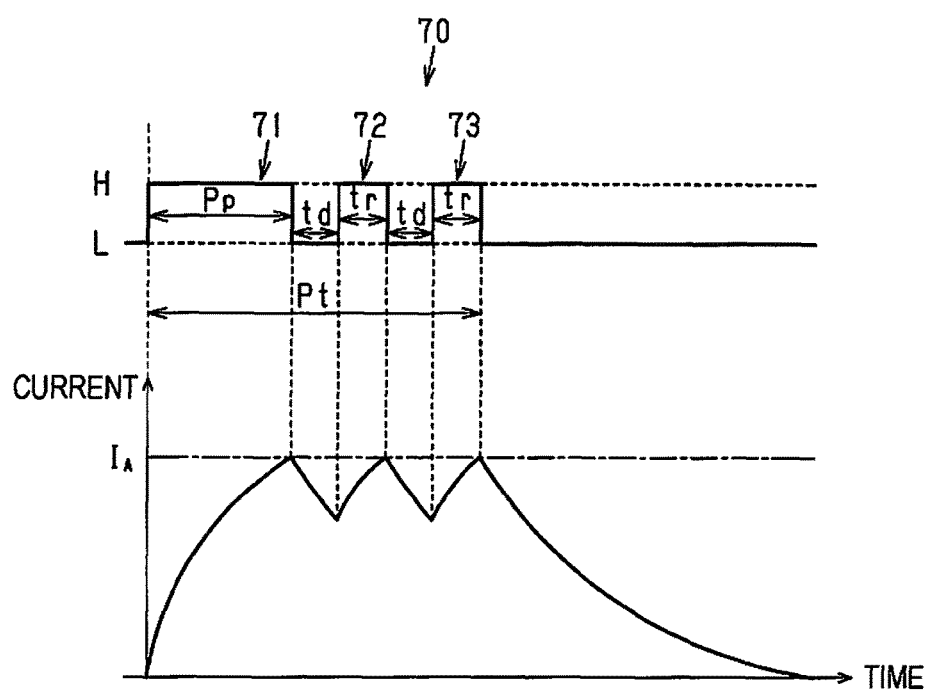
FIG. 6 is a time chart illustrating a relationship between a signal which is input to the driving circuit and a value of the current that flows in a coil.
Figure 7:
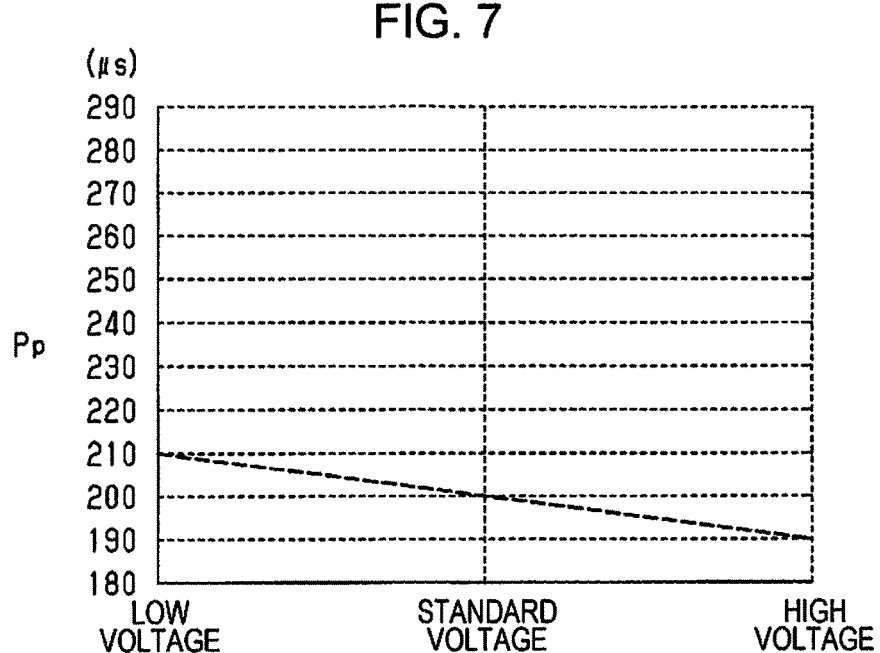
FIG. 7 is a graph illustrating a table of Pp determined based on a value of a voltage detected by a voltage detection unit.
Figure 8:
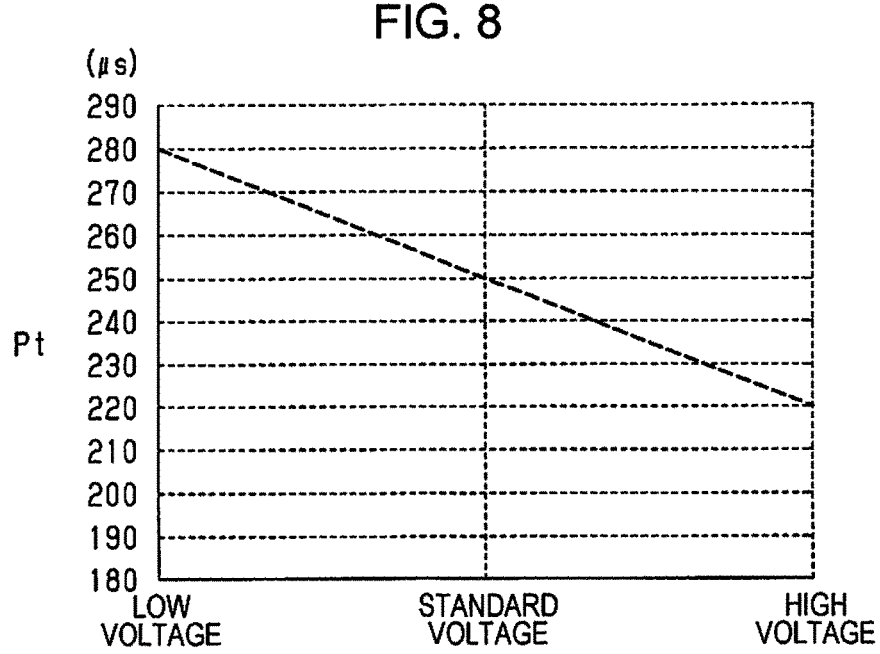
FIG. 8 is a graph illustrating a table of Pt determined based on the value of the voltage detected by the voltage detection unit.
Figure 9:
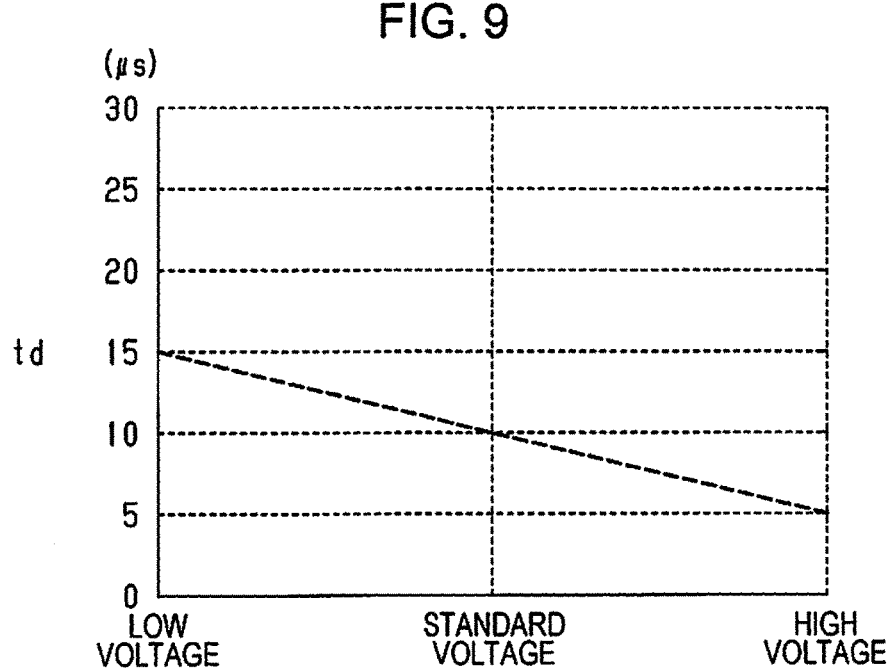
FIG. 9 is a graph illustrating a table of td determined based on the value of the voltage detected by the voltage detection unit.
Figure 10:
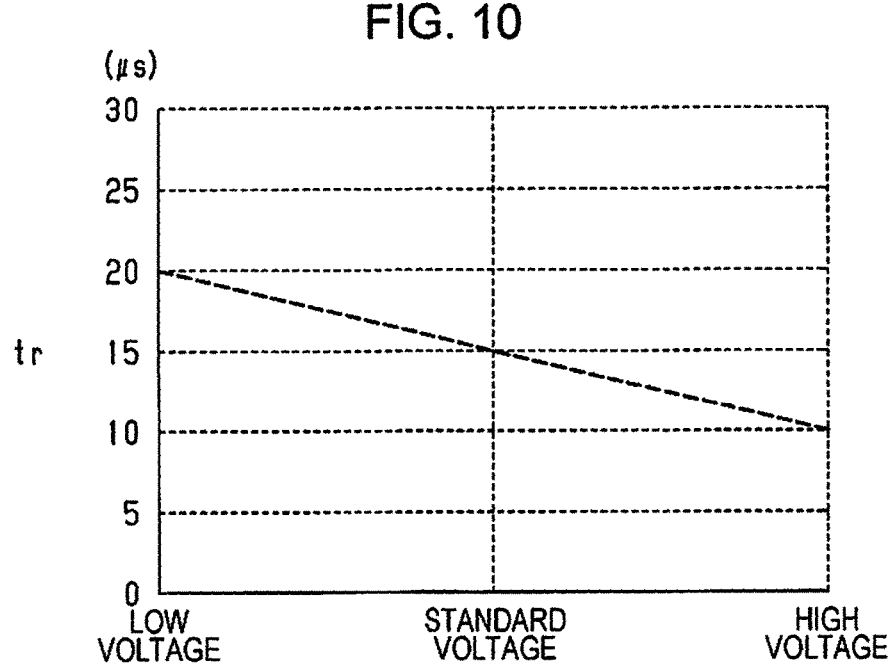
FIG. 10 is a graph illustrating a table of tr determined based on the value of the voltage detected by the voltage detection unit.

Next, description will be made on a relationship between the pulse generated from the signal generation unit 62 and the current that flows in a coil L using FIG. 6. In FIG. 6, a time chart illustrated at the upper side is a time chart of the pulse input to the base terminal of the transistor Tr and a graph illustrated at the lower side is a graph representing value of the current that flows in the coil L.

As illustrated in FIG. 6, the value of the current that flows in the coil L is increased or decreased by the pulse generated from the signal generation unit 62. The control unit 61 causes the signal generation unit 62 to generate a signal 70, of which duration becomes Pt, when a single wire 20 is jetted on the medium P. The signal 70 is configured with a plurality of pulses. In the present embodiment, the signal 70 is configured with a total of three pulses of a first pulse 71, a second pulse 72, and a third pulse 73 and the three pulses are input to the driving circuit 60 sequentially from the first pulse 71. The first pulse 71 has duration of Pp (initial duration) and the second pulse 72 and the third pulse 73 have duration of tr (duration-after-interruption). In the signal 70, respective pulses 71 to 73 are generated from the signal generation unit 62 at predetermined intervals. Specifically, the control unit 61 causes the second pulse 72 to be generated after a time period of td (interruption time period), after causing the first pulse 71, of which duration becomes Pp, to be generated from the signal generation unit 62. The control unit 61 causes the third pulse 73 to be generated after the time period of td, after causing the second pulse 72, of which duration becomes tr, to be generated from the signal generation unit 62. The control unit 61 causes the third pulse 73, of which duration becomes tr, to be generated from the signal generation unit 62 and ends generation of the signal 70. In other words, the energization state of the driving circuit 60 to which the signal 70 is input is kept in the OFF state for the interruption time period (td), after being kept in the ON state for initial duration (Pp). The energization state of the driving circuit 60 becomes the ON state again from the OFF state, becomes the OFF state again for interruption time period (td) after being kept in the ON state for duration-after-interruption (tr), and finally, is kept in the ON state for duration-after-interruption (tr). That is, Pt which is duration of the signal 70 becomes "Pp+2td+2tr".

When the signal 70 configured as described above is input to the driving circuit 60, the energization state of the driving circuit 60 is switched between the ON state and the OFF state for each predetermined time period. That is, the energization state of the driving circuit 60 becomes the ON state when an input level is at a high level in the base terminal of the transistor Tr by input of the signal 70 and becomes the OFF state when the input level is at a low level in the base terminal of the transistor Tr by input of the signal 70. The value of the current that flows in the coil L rises in a time period during which the energization state of the driving circuit 60 is the ON state and falls in a time period during which the energization state of the driving circuit 60 is the OFF state. The energization state of the driving circuit 60 is switched for each predetermined time period such that the value of the current that flows in the coil L repeatedly rises and falls and is kept constant in the vicinity of alternate long and short dashed lines illustrate in FIG. 6. The alternate long and short dashed lines indicates an allowable value $I_A$ represents which is a value of the current allowable to the driving circuit 60.

When the current that flows in the coil L becomes large, the current that flows in other elements such as the transistor Tr also becomes large. If the value of the current that flows in the coil L exceeds the allowable value $I_A$, there is a possibility that load is applied to respective elements constituting the driving circuit 60 and the driving circuit 60 does not function normally. When the value of the current that flows in the coil L is not kept constant, density variation occurs for each dot jetted to the medium P and recording quality is constant. For that reason, the control unit 61 switches the energization state of the driving circuit 60 such that the value of the current flowing in the coil L is kept constant to be less than or equal to the allowable value $I_A$. Keeping the value of the current flowing in the coil L constant corresponds to keeping the value of the current flowing in the driving circuit 60 constant.

In the present embodiment, control is performed such that the energization state of the driving circuit is switched from the ON state to the OFF state at timing that the value of the current flowing in the coil L reaches the allowable value $I_A$. Such control is generally called chopper control and is utilized in various fields for obtaining a desired voltage and current from a power supply. The control unit 61 causes the signal generation unit 62 to generate the signal 70, which is suitable for time and circumstances, using a total of four parameters of the Pp, Pt, td, and tr constituting the signal 70 such that value of the current that flows in the coil L is kept constant.

The control units 61 illustrated in FIG. 7, FIG. 8, FIG. 9 and FIG. 10 include tables in which the Pp, Pt, td, and tr, which are parameters of the signal 70, correspond respectively to the voltages detected by the voltage detection unit 64. The tables are represented by graphs formed by using the voltage of the driving power supply 63 as a lateral axis and time as the longitudinal axis and in the graphs, the values of the Pp, Pt, td, and tr to the values of the voltages detected by the voltage detection unit 64 are represented, respectively. The graphs illustrated in FIG. 7 to FIG. 10 are formed in graphs, which represent characteristics of descending toward the right in which respective values of the Pp, Pt, td, and tr become smaller as the detected voltages approach the high voltage. The control unit 61 acquires the values of the Pp, Pt, td, and tr based on the values of the voltages detected by the voltage detection unit 64 using the tables. For example, in a case where the voltages detected by the voltage detection unit 64 is the high voltage, the control unit 61 acquires the values of the Pp, Pt, td, and tr as 190 μs, 220 μs, 5 μs, and 10 μs, respectively.

Figure 11:
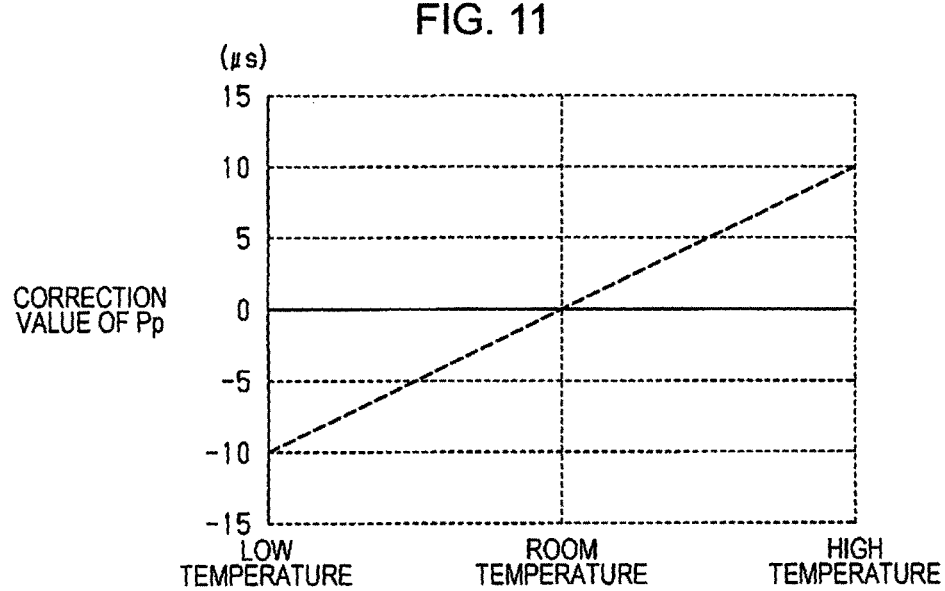
FIG. 11 is a graph illustrating a table of a correction value of the Pp determined based on a value of a temperature detected by a temperature detection unit.
Figure 12:
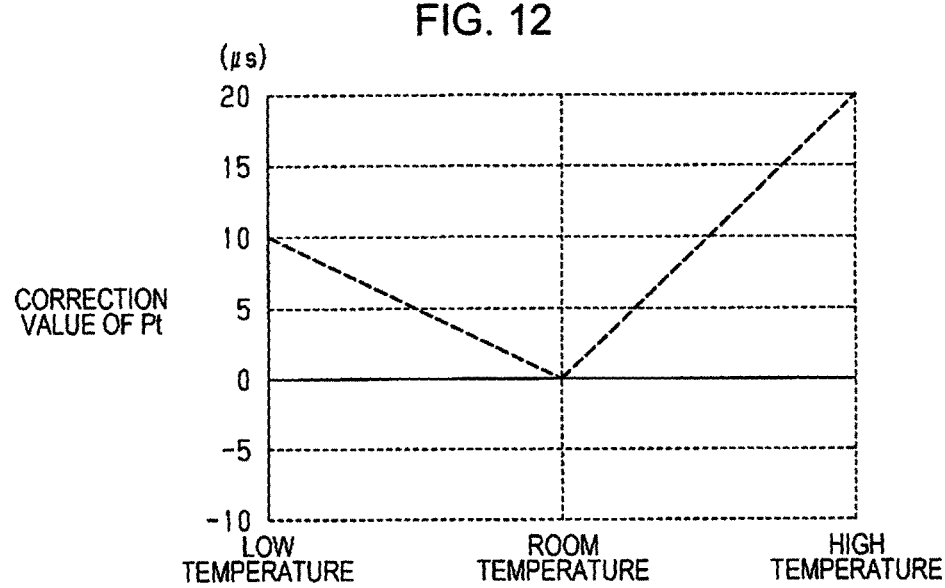
FIG. 12 is a graph illustrating a table of a correction value of the Pt determined based on the value of the temperature detected by the temperature detection unit.
Figure 13:
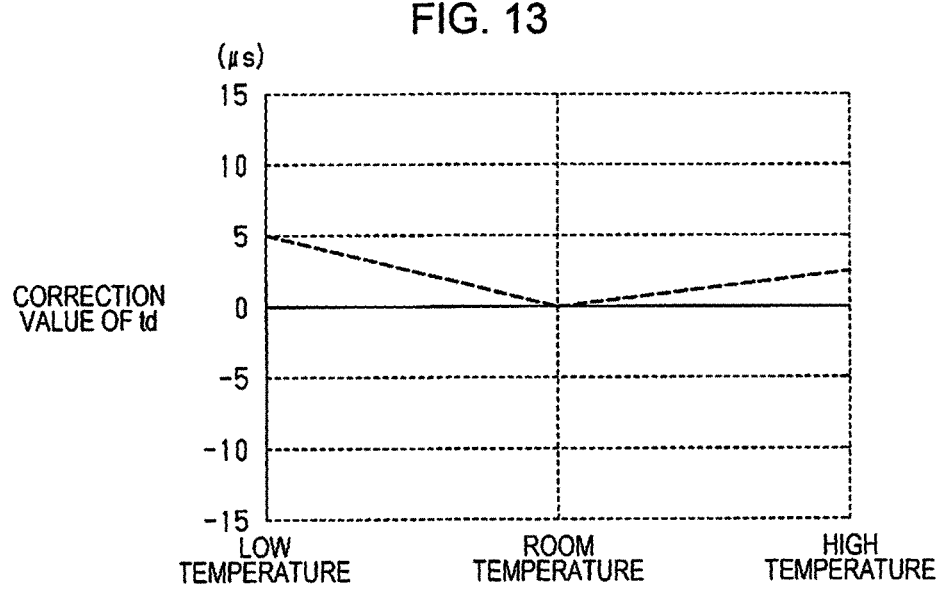
FIG. 13 is a graph illustrating a table of a correction value of the td determined based on the value of the temperature detected by the temperature detection unit.
Figure 14:
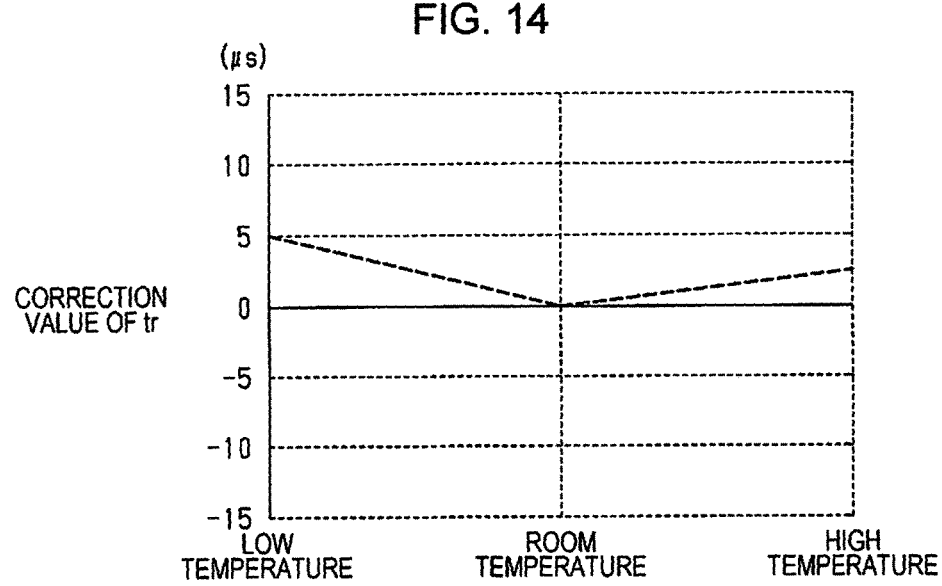
FIG. 14 is a graph illustrating a table of a correction value of the tr determined based on the value of the temperature detected by the temperature detection unit.

As illustrated in FIG. 11, FIG. 12, FIG. 13 and FIG. 14, the control unit 61 includes tables in which correction values for correcting the Pp, Pt, td, and tr, which are parameters of the signal 70, correspond respectively to the temperatures detected by the temperature detection unit 65. The tables are represented by graphs formed by using the temperature of the head 21 as a lateral axis and time as the longitudinal axis and in the graphs, the correction values of the Pp, Pt, td, and tr to the values of the temperature detected by the temperature detection unit 65 are represented, respectively. The graph illustrated in FIG. 11 is formed in a graph, which represents characteristics of ascending toward the right in which the correction value of the Pp becomes larger as the detected temperature approaches the high temperature. The graphs illustrated in FIG. 12 to FIG. 14 are formed in graphs in which correction values of the Pp, Pt, td, and tr become larger as the detected temperature approaches the high temperature or the low temperature. The control unit 61 acquires the correction values of the Pp, Pt, td, and tr based on the detected temperature values of the temperature detection unit 65 using the tables. For example, in a case where the temperature detected by the temperature detection unit 65 is the low temperature, the control unit 61 acquires the correction values of the Pp, Pt, td, and tr as −10 μs, +10 μs, +5 μs, and +5 μs, respectively. The tables illustrated in FIG. 7 to FIG. 14 are just an example only and numeric values are exaggerated in order for description to be easily understood.

Next, description will be made on a process routine executed by the control unit 61 during a recording operation.

Figure 15:
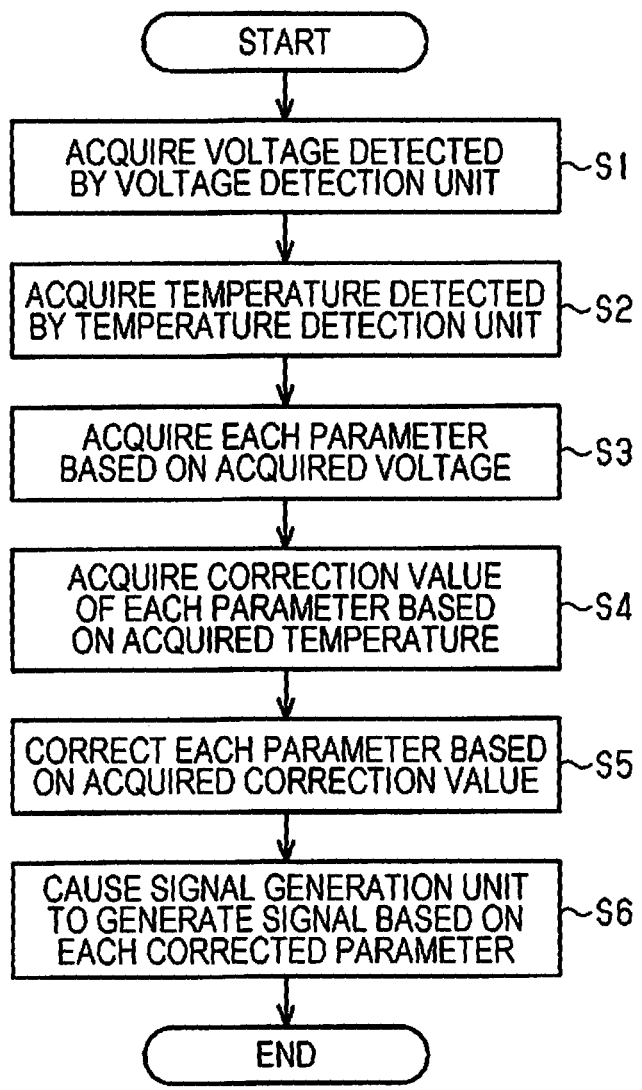
FIG. 15 is a flowchart illustrating a process routine executed by a control unit when recording is performed.

As illustrated in FIG. 15, when a recording job is input to the control unit 61 through, for example, a host device such as personal computer electrically connected with the recording apparatus 11 and an operation unit such as a touch panel or an operation button provided in the recording apparatus 11, the process routine, which indicates the recording operation when the head 21 performs recording on the medium P, is executed by the control unit 61.

First, in Step S1, the control unit 61 acquires a value of a voltage of the driving power supply 63 detected by the voltage detection unit 64. Next, in Step S2, the control unit 61 acquires a value of a temperature of the head 21 detected by the temperature detection unit 65. Next, in Step S3, the control unit 61 acquires each of values of the Pp, the Pt, td, and tr from the value of the voltage acquired in Step S1 using the tables illustrated in FIG. 7 to FIG. 10. Next, in Step S4, the control unit 61 acquires each of correction values of the Pp, Pt, td, and tr from the value of the temperature acquired in Step S2 using the tables illustrated in FIG. 11 to FIG. 14. Next, in Step S5, the control unit 61 corrects the values of the Pp, Pt, td, and tr acquired in Step S3 by the correction value acquired in Step S4. Specifically, the correction values of the Pp, Pt, td, and tr acquired in Step S4 are respectively added to the values of the Pp, Pt, td, and tr acquired in Step S3 so as to be corrected. For example, in a case where the voltage detected by the voltage detection unit 64 is the high voltage and the temperature detected by the temperature detection unit 65 is the low temperature, respective parameters are corrected such that the Pp is 180 (=190−10) μs, Pt is 230 (=220+10) μs, td is 10 (=5+5) μs, and tr is 15(=10+5) μs.

Next, in Step S6, the control unit 61 causes the signal generation unit 62 to generate the signal 70 based on the values of the Pp, Pt, td, and tr determined in Step S5. That is, the control unit 61 controls the signal 70 to be generated from the signal generation unit 62. The control unit 61 acquires the value of the voltage detected by the voltage detection unit 64 and the value of the temperature detected by the temperature detection unit 65 and controls such that the energization state of the driving circuit 60 is switched for each time period determined based on respective acquired values. In other words, the control unit 61 determines initial duration (Pp) which is a time period during which the ON state continues, an interruption time period (td) during which the OFF state continues, and duration-after-interruption (tr) during which the ON state after the interruption time period (td) in control of the energization state in the driving circuit 60. The control unit 61 repeatedly executes the process routine for each dot jetted to the medium P by the wire 20.

Next, description will be made on effects of the recording apparatus 11 configured as described above.

Figure 16:
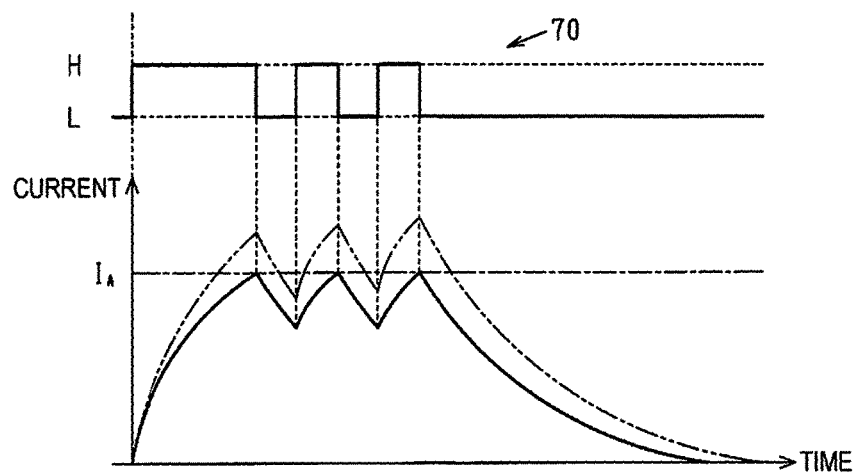
FIG. 16 is a time chart illustrating a relationship between signals in the related art at the time of room temperature and standard voltage and at the time of low temperature and high voltage and value of the currents corresponding to the signals in the related art.

As illustrated in FIG. 16, in the related art, the signal 70 which is always constant is generated from the signal generation unit 62 when the head 21 performs recording and thus, the time at which the energization state of the driving circuit 60 is switched is constant. For that reason, even in a case where the temperature of the head 21 is the low temperature and the voltage applied from the driving power supply 63 to the driving circuit 60 is the high voltage, the signal 70 which is constant is generated from the signal generation unit 62, similarly to a case of at the time of room temperature and standard voltage. Normally, a resistance value of metal becomes smaller and the resistance value of semiconductor becomes larger, under the low temperature. On the other hand, characteristics reverse to a case of the low temperature are shown under the high temperature. That is, the temperature of the head 21 varies and accordingly, the resistance value of the driving circuit 60 varies.

Fluctuations may occur in the voltage applied from the driving power supply 63 in the driving power supply 63. Normally, even in a power supply designed to supply a rated voltage, it is known that outputting of the voltage of which the value is constant is difficult and actually, the value of the voltage varies. In the driving power supply 63, when the number of wires 20 to be driven simultaneously is increased or decreased or power is divided for driving of other members, fluctuations in the voltage may temporarily occur even due to variation in an output load. In this case, when the voltage applied to the driving circuit 60 becomes a voltage higher than a standard voltage, the value of the current that flows in the driving circuit 60 becomes larger. When the voltage applied to the driving circuit 60 becomes a voltage lower than the standard voltage, the value of the current that flows in the driving circuit 60 becomes smaller. For that reason, the temperature of the head 21 or the voltage of the driving power supply 63 vary and accordingly, the value of the current that flows in the coil L also varies.

Here, in the graph illustrating the value of the current that flows in the coil L in FIG. 16, the value of the current indicated by a solid line is a value of the current at the time when the temperature of the head 21 is the room temperature and the voltage of the driving power supply 63 is the standard voltage (at the time of room temperature and standard voltage). The value of the current indicated by a two-dot chain line is a value of the current at the time when the temperature of the head 21 is the low temperature and the voltage of the driving power supply 63 is the high voltage (at the time of low temperature and high voltage).

As illustrated in FIG. 16, rise-up of the value of the current that flows in the coil L at the time of low temperature and high voltage is sharper than that at the time of room temperature and standard voltage. For that reason, there is a possibility that even when the signal 70 is set such that a value of the current at the time of room temperature and standard voltage is set so as not to exceed the allowable value $I_4$, the value of the current may exceed the allowable value $I_4$ at the time of low temperature and high voltage. Furthermore, there is a possibility that the value of the current that flows in the coil L is not kept constant.

Figure 17:
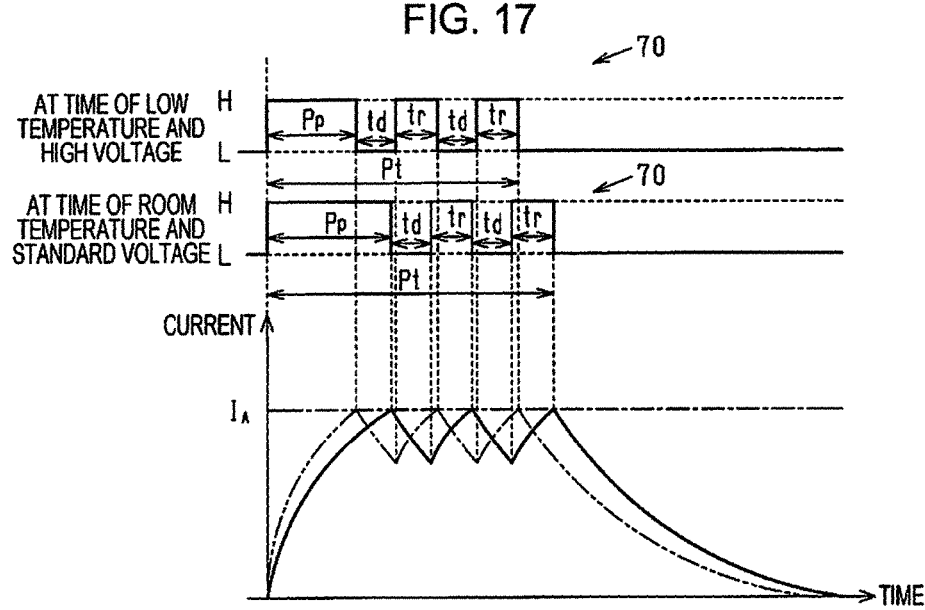
FIG. 17 is a time chart illustrating a relationship between signals of the present embodiment at the time of room temperature and standard voltage and at the time of low temperature and high voltage and value of the current corresponding to the signals of the present embodiment.
Figure 20:
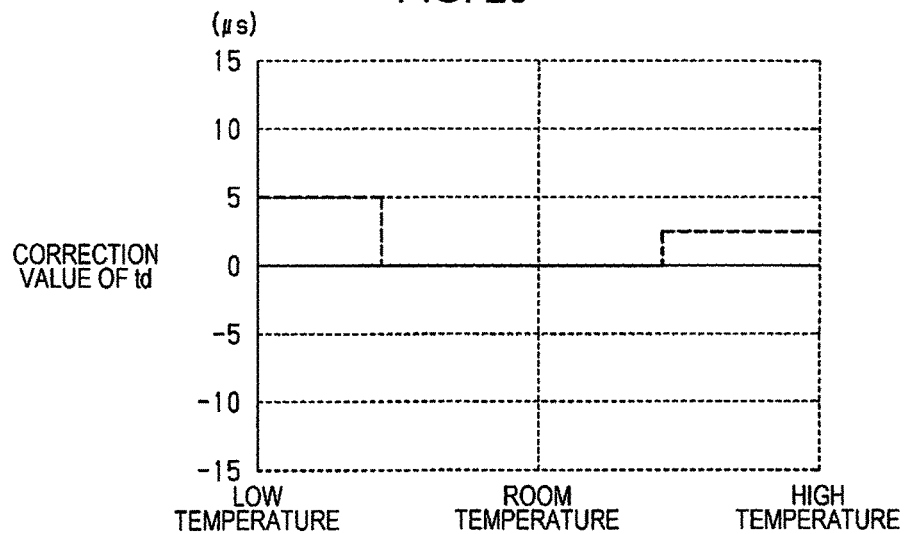
FIG. 20 is a graph illustrating a map of a correction value of the td determined based on the value of the temperature detected by the temperature detection unit.
Figure 21:
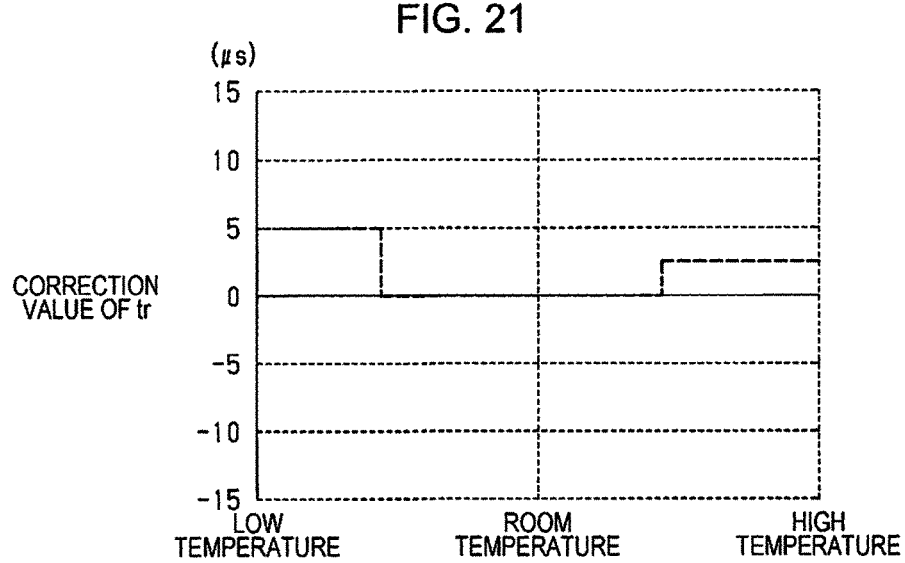
FIG. 21 is a graph illustrating a map of a correction value of the tr determined based on the value of the temperature detected by the temperature detection unit.

In that point, as illustrated in FIG. 17, the control unit 61 causes the signal generation unit 62 to generate the signal 70 determined based on the temperature of the head 21 and the voltage applied to the driving circuit 60 in the recording apparatus 11 of the present embodiment. That is, a switching time between the ON state and the OFF state of the energization state in the driving circuit 60 is changed by the value of the temperature of the head 21 and the value of the voltage of the driving power supply 63. For example, the signal generation unit 62 is caused to generate the signal 70 such that Pp and Pt at the time of low temperature and high voltage become shorter than those at the time of room temperature and standard voltage. For that reason, even when rise-up of the value of the current that flows in the coil L became sharp like at the time of low temperature and high voltage, the value of the current that flows in the coil L is kept constant in the vicinity the allowable value $I_4$ similar to at the time of room temperature and standard voltage. On the other hand, at the time when the temperature of the head 21 is the high temperature and the voltage of the driving power supply 63 is the low voltage (at the time of high temperature and low voltage), rise-up of the value of the current that flows in the coil L becomes blunt. For that reason, as illustrated in FIG. 7 to FIG. 14, the signal generation unit 62 is caused to generate the signal 70 such that each of the Pp, Pt, td, and tr at the time of high temperature and low voltage becomes longer that at the time of room temperature and standard voltage. That is, according to the recording apparatus 11 in the present embodiment, even when the temperature of the head 21 and the value of the voltage of the driving power supply 63 vary, the value of the current that flows in the coil L is kept constant and recording is stably performed.

According to the embodiment described above, the following effects may be obtained.

(1) The control unit 61 controls the energization state of the driving circuit 60 on the basis of time based on the voltage of the driving power supply 63 detected by the voltage detection unit 64 and the temperature of the head 21 detected by the temperature detection unit 65 and thus, it is possible to keep the current that flows in the driving circuit 60 constant.

(2) The control unit 61 controls the energization state of the driving circuit 60 by controlling the signal 70 input to the driving circuit 60 and thus, it is possible to easily control the energization state of the driving circuit 60.

(3) The control unit 61 determines initial duration (Pp), the interruption time period (td), and duration-after-interruption (tr) to thereby make it possible to finely control the energization state of the driving circuit 60, in control of the energization state in the driving circuit 60.

The embodiment described above may be modified in the following. The following modification examples may be suitably combined.

As illustrated in FIG. 18, FIG. 19, FIG. 20 and FIG. 21, a configuration that includes maps, in which the correction values of the Pp, Pt, td, and tr are divided by threshold values and which are the replacement of the table illustrated in FIG. 11 to FIG. 14, in the embodiment described above, may be adopted. When description is made by paying attention to FIG. 18, the correction value of the Pp is set as −10 μs in a case where the temperature of the head 21 falls within a low temperature range, set as 0 μs in a case where the temperature of the head 21 falls within a room temperature range, and set as +10 μs in a case where the temperature of the head 21 falls within a high temperature range. That is, an amount of data that the control unit 61 stores is small in comparison with the table linearly correlated with the temperature of the head 21. According to the modification example, it is possible to make processing of the control unit 61 in Step S4 easy and reduce load on the control unit 61. The maps illustrated in FIG. 18 to FIG. 21 are just an example only and numeric values are exaggerated in order for description to be easily understood.

In the embodiment described above, the control unit 61 may be configured to switch the energization state of the driving circuit 60 based only on the value of the voltage of the driving power supply 63. That is, the control unit 61 may be configured not to correct respective parameters of the Pp, Pt, td, and tr based on the value of the temperature of the head 21. According to the modification example, the following effects may be obtained.

(4) The control unit 61 controls the energization state of the driving circuit 60 on the basis of time determined based on the voltage of the driving power supply 63 detected by the voltage detection unit 64 and thus, it is possible to keep the current that flows in the driving circuit 60 constant. Accordingly, even in a configuration in which the energization state of the driving circuit 60 is switched based on time, the head 21 is able to stably perform recording on the medium P.

In the embodiment described above, the control unit 61 may be configured to switch the energization state of the driving circuit 60 based only on the value of the temperature of the head 21. In this case, a configuration, in which for example, Pp, Pt, td, and tr are uniformly set as 200 μs, 250 μs, 10 μs, and 15 μs, respectively, and respective parameters are corrected based on the value of the temperature of the head 21, may be adopted. That is, the control unit 61 may determine respective parameters of the Pp, Pt, td, and tr based only on the value of the temperature of the head 21. According to the modification example, the following effects may be obtained.

(5) The control unit 61 controls the energization state of the driving circuit 60 on the basis of time determined based on the temperature of the head 21 detected by the temperature detection unit 65 and thus, it is possible to keep the current that flows in the driving circuit 60 constant. Accordingly, even in a configuration in which the energization state of the driving circuit 60 is switched based on time, the head 21 is able to stably perform recording on the medium P.

In the embodiment described above, the signal 70 may be configured with either two pulses or four or more pulses. As the energization state of the driving circuit 60 is finely switched, a heat generation amount from an element becomes larger while the value of the current that flows in the coil L becomes stable. For that reason, in the embodiment described above, the signal 70 may be configured with three pulses of the first pulse 71, the second pulse 72, and the third pulse 73.

In the embodiment described above, Step S2 and Step S3 may be changed with each other in the process routine performed by the control unit 61. The process routine may be a process routine in which the voltage of the driving power supply 63 is acquired after the temperature of the head 21 is acquired and a process routine in which the voltage and the temperature are simultaneously acquired.

In the embodiment described above, the control unit 61 may be configured to also function as the temperature detection unit 65. That is, a configuration, in which the control unit 61 is connected with the thermistor 28 and the control unit 61 acquires a resistance value of the thermistor 28 to calculate the temperature of the head 21, may be adopted.

In the embodiment described above, configurations of the voltage detection unit 64 and the temperature detection unit 65 are not limited to configurations in which respective values of the voltage and the temperature are always detected, respectively, and may include configuration in which the values of the voltage and the temperature are suitably detected according to the start of the process routine by the control unit 61, respectively.

In the embodiment described above, the number of wires 20 included in the head 21 may be a single wire 20.

In the embodiment described above, the body portion 23 of the head 21 may not have the two-stage configuration of the front stage unit 46 and the rear stage unit 47 and may be configured to have any one of the front stage unit 46 and the rear stage unit 47.

In the embodiment described above, the head 21 is not limited to a suction type head that performs recording on a medium in such a way that the wire levers 51 are attracted by magnetization so as to allow the wire 20 to strike the medium P, when recording is performed. For example, the head 21 may be a release type head that performs recording on in such a way that the magnetic force of the wire levers 51 held by the magnetic force is cancelled so as to blast off the wire levers 51 and allow the wire 20 to strike the medium P, when recording is performed.

What is claimed is:

1. A recording apparatus comprising:
a head that includes a wire and performs recording on a medium by allowing the wire to strike the medium;
a temperature detector that is mounted on the head and detects a temperature of the head;
a driving circuit for driving the wire; and
a controller that controls an energization state of the driving circuit,
wherein the controller switches the energization state of the driving circuit between an ON state and an OFF state at each time determined by the controller such that a value of a current that flows in the head repeatedly raises and falls, based on the temperature detected by the temperature detector, while the head performs recording of a single dot on the medium.

2. The recording apparatus according to claim 1, further comprising:
a voltage detector that detects a voltage applied to the driving circuit,
wherein the controller switches the energization state of the driving circuit between the ON state and the OFF state at each time determined by the controller, based on the temperature of the head detected by the temperature detector and the voltage detected by the voltage detector when the head performs recording on the medium.

3. The recording apparatus according to claim 1,
wherein the controller controls a signal which is input to the driving circuit so as to switch the energization state of the driving circuit to thereby control the energization state of the driving circuit.

4. The recording apparatus according to claim 1,
wherein, in control of the energization state in the driving circuit, the controller determines initial duration during which the ON state continues, an interruption time period during which the OFF state continues, and duration-after-interruption during which the ON state continues after the interruption time period.

5. The recording apparatus according to claim 4,
wherein, in control of the energization state in the driving circuit, the controller controls the energization state such that the interruption time period and the duration-after-interruption are repeated after the initial duration to keep the current in a constant range.

6. A recording apparatus comprising:
a head that includes a wire and performs recording on a medium by allowing the wire to strike the medium;
a driving circuit for driving the wire;
a voltage detector that detects a voltage applied to the driving circuit; and
a controller that controls an energization state of the driving circuit,
wherein the controller switches the energization state of the driving circuit between an ON state and an OFF state at each time determined by the controller such that a value of a current that flows in the head repeatedly raises and falls, based on the voltage detected by the voltage detector, while the head performs recording of a single dot on the medium.

7. A control method of a recording apparatus which performs recording on a medium by allowing a wire to strike the medium, the method comprising:
while a head including the wire performs recording of a single dot on the medium,
acquiring a value of at least one of a temperature of the head and a voltage applied to a driving circuit that drives the wire; and
switching an energization state of the driving circuit between an ON state and an OFF state at each time determined such that a value of a current that flows in the head repeatedly raises and falls, based on the acquired value.

8. The control method of a recording apparatus according to claim 7,
wherein a signal which is input to the driving circuit is controlled so as to switch the energization state of the driving circuit to thereby control the energization state of the driving circuit.

9. The control method of a recording apparatus according to claim 7,
wherein, in control of the energization state in the driving circuit, initial duration during which the ON state continues, an interruption time period during which the OFF state continues, and duration-after-interruption during which the ON state continues after the interruption time period, are determined.

10. The control method of a recording apparatus according to claim 9,
wherein, in control of the energization state in the driving circuit, the energization state is controlled such that the interruption time period and the duration-after-interruption are repeated after the initial duration to keep the current in a constant range.

* * * * *